US010601760B2

(12) United States Patent
Lee et al.

(10) Patent No.: US 10,601,760 B2
(45) Date of Patent: *Mar. 24, 2020

(54) TECHNIQUES FOR DEVICE CONFIGURATION OF PROSPECTIVE CONTACTS USING MESSAGING HISTORY INFORMATION

(71) Applicant: Facebook, Inc., Menlo Park, CA (US)

(72) Inventors: Han Gyul Lee, Sunnyvale, CA (US); Louis Benoit Philippe Boval, San Francisco, CA (US); Aman Dhesi, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 15/332,710

(22) Filed: Oct. 24, 2016

(65) Prior Publication Data

US 2018/0113913 A1    Apr. 26, 2018

(51) Int. Cl.
*G06F 17/30* (2006.01)
*H04L 12/58* (2006.01)
*G06Q 50/00* (2012.01)
*G06Q 10/10* (2012.01)
*H04W 4/14* (2009.01)

(52) U.S. Cl.
CPC ........... *H04L 51/32* (2013.01); *G06Q 10/107* (2013.01); *G06Q 50/01* (2013.01); *H04L 51/16* (2013.01); *H04W 4/14* (2013.01)

(58) Field of Classification Search
USPC ........ 707/607, 609, 687, 705, 790, 813, 821
See application file for complete search history.

(56) References Cited

U.S. PATENT DOCUMENTS

| 2010/0042570 | A1* | 2/2010 | Mayers ................. H04M 3/533 706/46 |
| 2016/0247191 | A1* | 8/2016 | Bhalla ................ G06Q 30/0255 |
| 2017/0236060 | A1* | 8/2017 | Ignatyev ............. G06F 16/2365 706/46 |
| 2017/0293623 | A1* | 10/2017 | Kimball ................. H04L 51/32 |

* cited by examiner

*Primary Examiner* — Sana A Al-Hashemi

(57) ABSTRACT

Techniques for device configuration of prospective contacts using messaging history information are described. In one embodiment, an apparatus may comprise a client front-end component operative to receive a client inbox request for a user account from a client device, the user account for a communication system; and send an ordered prospective contact list to the client device in response to the client inbox request; a prospective contact list component operative to generate a prospective contact list for a user account, wherein generating the prospective contact list for the user account excludes any existing contacts from an existing contact list for the user account; a predicted interest component operative to determine a predicted communication interest for each prospective contact on the prospective contact list; and a contact ranking component operative to determine a ranking weight for each prospective contact on the prospective contact list. Other embodiments are described and claimed.

17 Claims, 13 Drawing Sheets

500

Determine a prospective contact list for a user account for a communication system, the prospective contact list comprising a plurality of prospective contacts.
502

Determine a predicted communication interest for each prospective contact on the prospective contact list for the user account.
504

Determine a ranking weight for each prospective contact on the prospective contact list based on the predicted communication interest for each prospective contact.
506

Order the prospective contact list for display for the user account based on the determined ranking weight for each prospective contact on the prospective contact list.
508

*FIG. 5*

TECHNIQUES FOR DEVICE CONFIGURATION OF PROSPECTIVE CONTACTS USING MESSAGING HISTORY INFORMATION

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for device configuration of prospective contacts using messaging history information. Some embodiments are particularly directed to techniques for device configuration of prospective contacts using messaging history information based on contact-of-contact relationships, soft-match relationships, and reverse-contact relationships. In one embodiment, for example, an apparatus may comprise a client front-end component operative to receive a client inbox request for a user account from a client device, the user account for a communication system; and send an ordered prospective contact list to the client device in response to the client inbox request, the ordered prospective contact list ordered for display for the user account based on a determined ranking weight for each prospective contact on the ordered prospective contact list; a prospective contact list component operative to generate a prospective contact list for a user account for a communication system based on a user repository for the communication system, the prospective contact list comprising a plurality of prospective contacts, wherein generating the prospective contact list for the user account excludes any existing contacts from an existing contact list for the user account; a predicted interest component operative to determine a predicted communication interest for each prospective contact on the prospective contact list for the user account; and a contact ranking component operative to determine a ranking weight for each prospective contact on the prospective contact list based on the predicted communication interest for each prospective contact list. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a logic flow for the system of FIG. 1.

DETAILED DESCRIPTION

Figure 1:
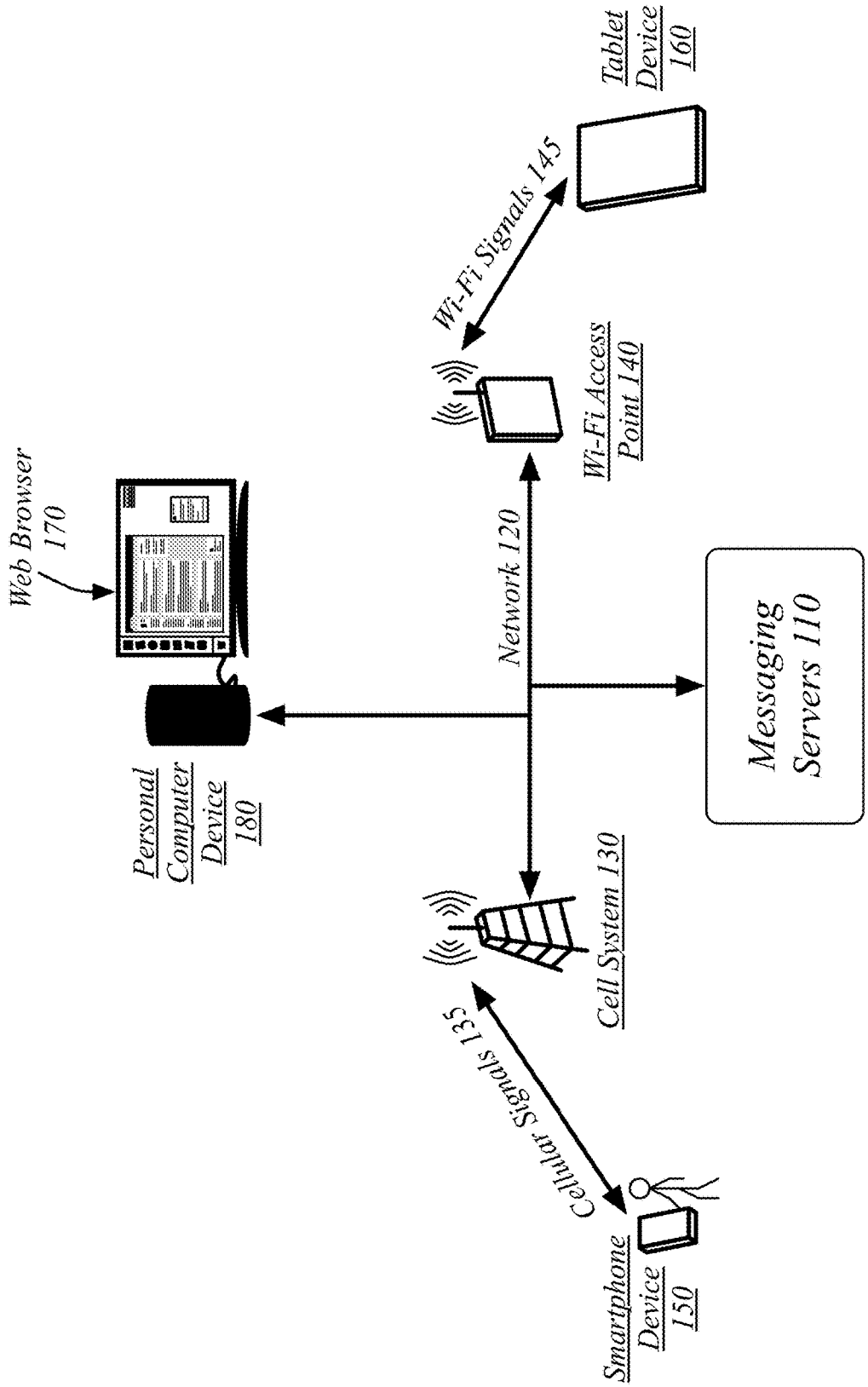
FIG. 1 illustrates an embodiment of a provisional contact promotion system.

A messaging system may support a large number of and a large variety of users. Users may have contacts on the messaging system, where contacts correspond to other users with which they have a relationship registered with the messaging system. Users may be provided with a variety of displays of their contacts according to various techniques. Users may also benefit from being provided with displays of other users of the messaging system that are not currently in their list of contacts for the messaging system, but that are predicted to be of interest to them for messaging communication.

In a messaging interface a user may be displayed recent threads, such as a number of the most-recently-active threads. This interface of recent threads may be useful to a user wishing to reengage with recent conversations. However, to increase a user's utility with a messaging system, and to increase the messaging system's engagement with a user, the user may be suggested prospective contact with which they may wish to engage. This may increase the number of users a user is in contact with, a user's engagement with the messaging system, and a user's level of activity on the messaging system.

It will be appreciated that the techniques described herein may be used in any system where users are suggested other users with which to communicate using a communication system, such as a messaging system, email system, voice communication system, video communication system, or any other communication system. The techniques described herein with regards to contacts in a messaging system may be used in any embodiment in which a plurality of users are promoted to another user for communication. Users for promotion may be selected from any of those available to the communication system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a provisional contact promotion system 100. In one embodiment, the provisional contact promotion system 100 may comprise a computer-implemented system having software applications comprising one or more components. Although the provisional contact promotion system 100 shown in FIG. 1 has a limited number of elements in a certain topology, it may be appreciated that the provisional contact promotion system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

The messaging system may use knowledge generated from interactions in between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
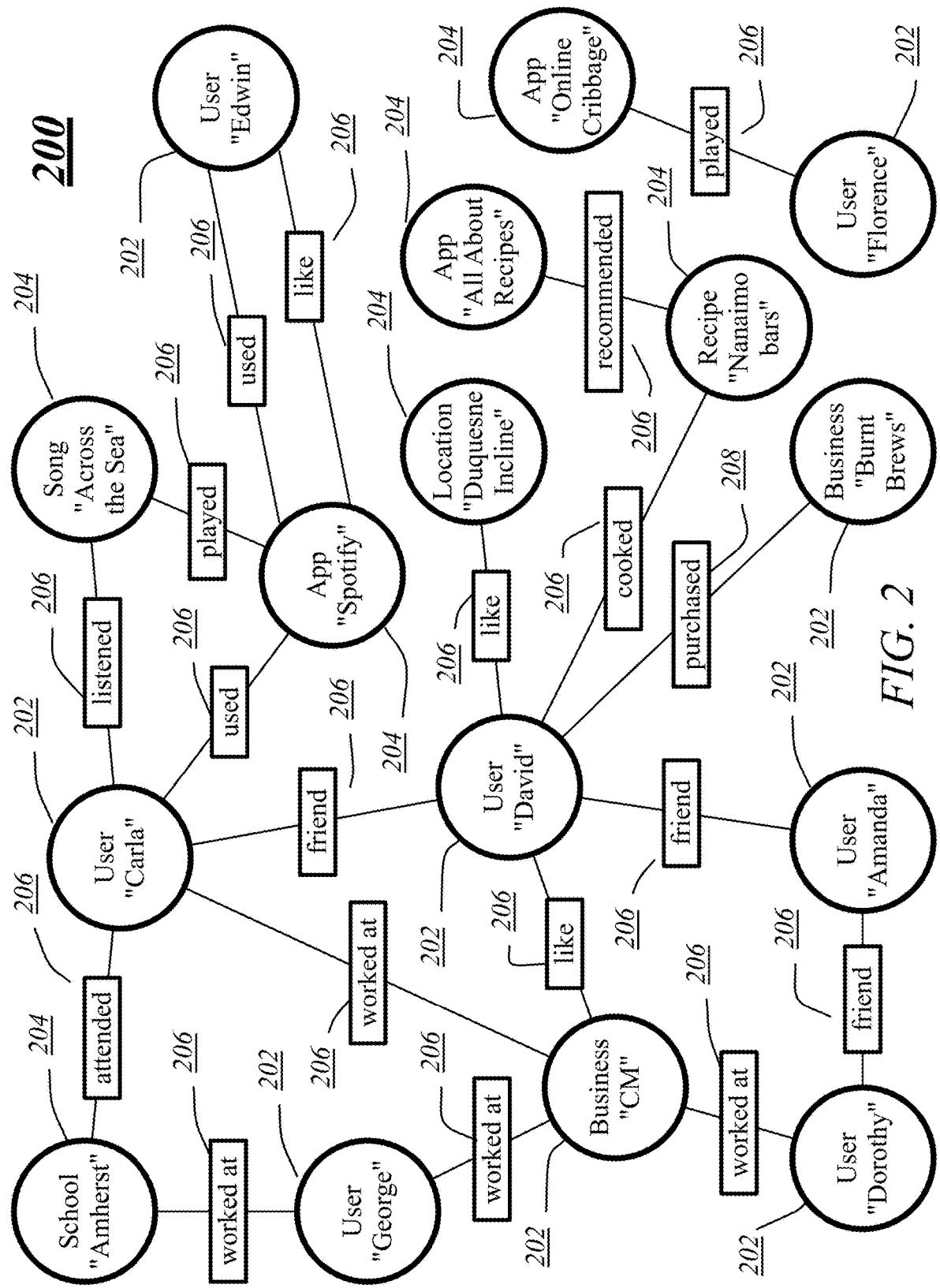
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to a consumer-to-business service and the consumer-to-business service may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3A:
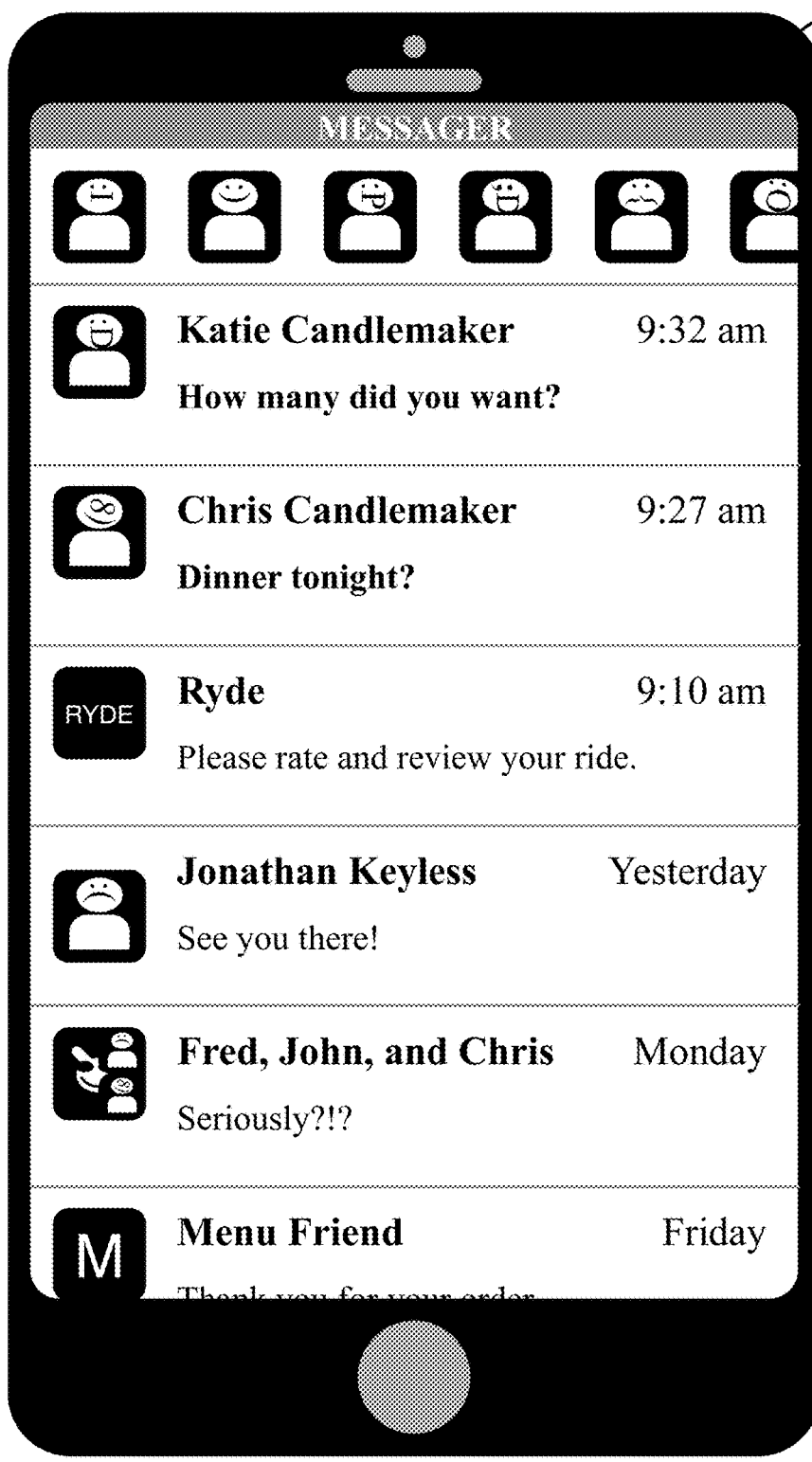
FIG. 3A illustrates an embodiment of a user interface with a prospective contacts display.

FIG. 3A illustrates an embodiment of a user interface 300 with a prospective contacts display 305.

A client device 320 may correspond to any device used to access a provisional contact promotion system 100. While in the illustrated embodiment of FIG. 3A the client device 320 resembles a smartphone device, it will be appreciated that the techniques described herein may be used with any type of device. The user interface 300 may generally correspond to a display of a user inbox for a messaging system.

The user interface 300 may comprise a display of a plurality of threads in an inbox for a user account. A portion of displayed threads may be threads with unread messages 310. A portion of displayed threads may be threads without unread messages 315. The threads with unread messages 310 may be displayed with a higher prominence than the threads without unread messages 315, such as by placing them in a more prominent position. In the illustrated embodiment of FIG. 3A, the user interface 300 may be scrolled downwards to reveal more threads.

The threads with unread messages 310 may be displayed in a higher position than the threads without unread messages 315, with additional threads without unread messages 315 being viewable by scrolling downwards. In some cases, sufficient threads with unread messages 310 may exist that the threads without unread messages 315 are only visible by scrolling downwards, with the threads with unread messages 310 being sufficient in number to take up all the available screen space in an initial display of an inbox. The display of threads in an inbox may comprise, for each thread, a display of a name of a thread, a last-received or last-exchanged messages in the thread, a preview of the contents of the thread, and an avatar for one or more users in the thread. The name of the thread may correspond to the name(s) of one or more participants in the thread other than the name for the user account for the inbox.

The user interface 300 for the messaging inbox may include a prospective contacts display 305. The prospective contacts display 305 may comprise a plurality of display elements, wherein each display element corresponds to a user of the messaging system that is being suggested as an additional contact for the user of the client device 320. The prospective contacts display 305 may be displayed in a high-prominence area of an inbox, such as the top of a display of the inbox. The prospective contacts display 305 may be displayed in an initial view of the inbox. The initial view of the inbox may be the view reached when loading a messaging client. The initial view of the inbox may be the view reached when selecting an inbox view control in the messaging client.

Figure 3B:
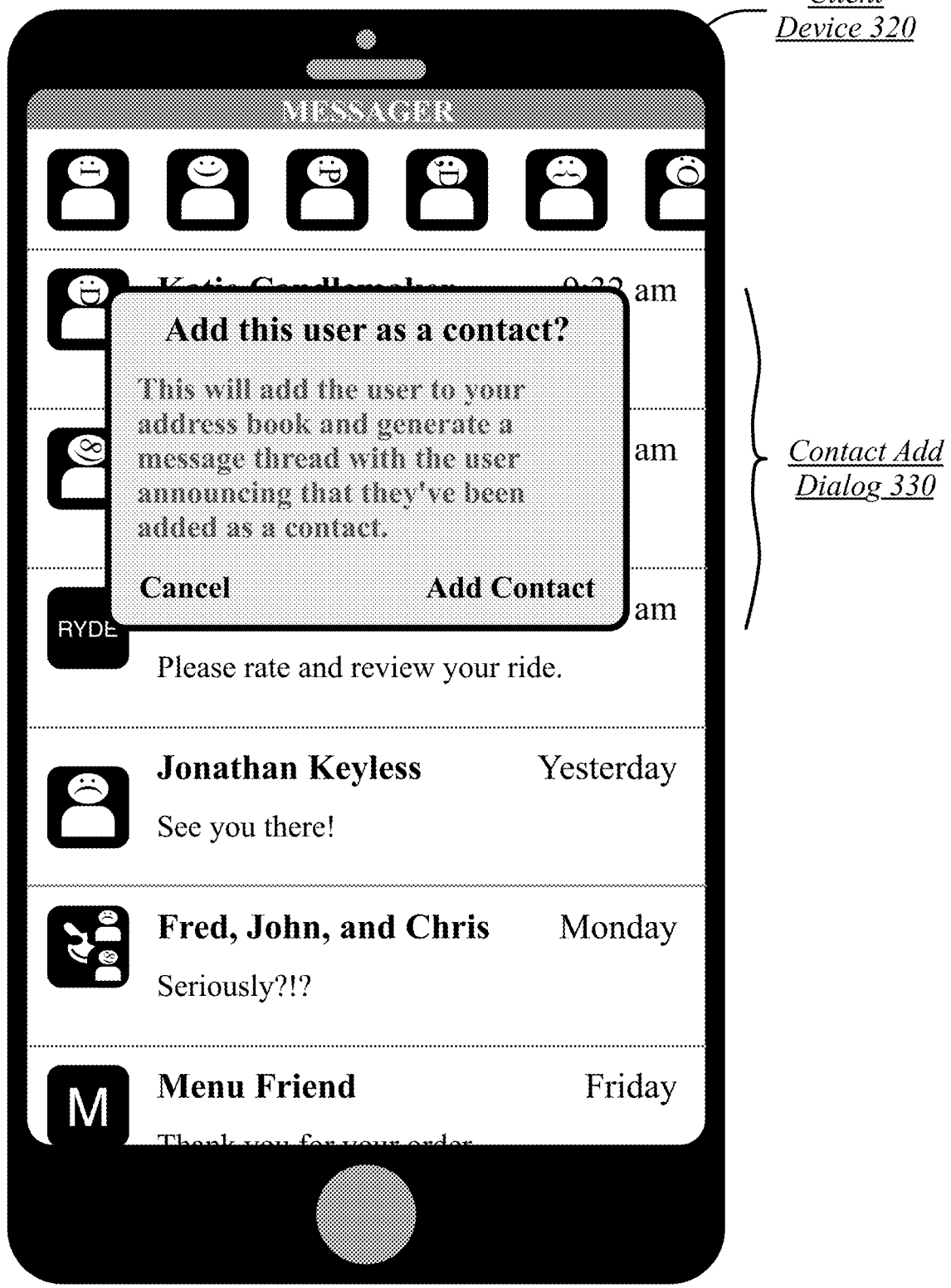
FIG. 3B illustrates an embodiment of a user interface with a contact add dialog.

FIG. 3B illustrates an embodiment of a user interface 325 with a contact add dialog 330.

The selection of a particular prospective contact of the prospective contacts display 305 may initiate a process of adding the selected prospective contact as a contact for the user of the client device 320 for the user's user account with a messaging system. In some embodiments, the contact may be immediately added. In some embodiments, a contact add dialog 330 may be displayed, where the contact add dialog 330 empowers a user to select whether they want to add a selected prospective contact to their contact list.

A contact add dialog 330 may include a cancel control empowering the user to refrain from adding the user as a contact and to extract themselves from the contact add dialog 330. A contact add dialog 330 may include an add contact control empowering the user to add the user as a contact. Adding a user as a contact may initiate actions within a messaging system, such as updating a local contact store (e.g., an operating-system managed address book) on the client device 320, updating a messaging-client-specific contact store for the messaging client (i.e., an application-specific address book, which may be maintained across multiple devices by the messaging system), initiating a message thread with the added contact, and/or notifying the added contact that they've been added as a contact by the user of the client device 320.

In some embodiments, a contact add dialog 330 may include information regarding a selected prospective contact. Prospective contact information may include, without limitation, a photo, a name, and one or more additional pieces of information regarding the contact, such as may include information communicating one or more connections between the user of the client device 320 and the prospective contact. This information may be presented as, for example, a user profile card for a user profile for the prospective contact with a social networking system.

Figure 3C:
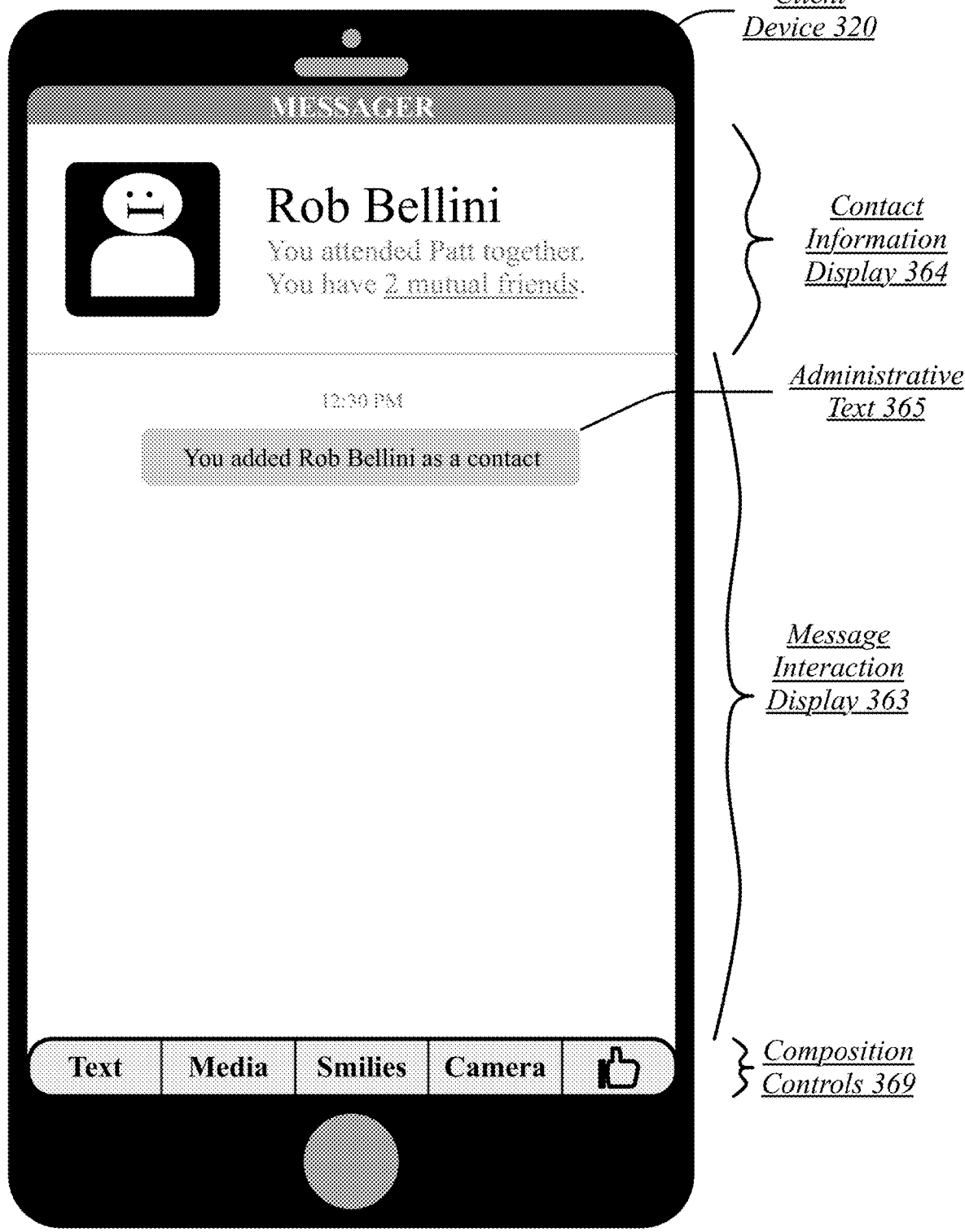
FIG. 3C illustrates an embodiment of a user interface for a message thread for an added contact on an adding client device.

FIG. 3C illustrates an embodiment of a user interface 350 for a message thread for an added contact on an adding client device 320.

The user interface 350 may be displayed in response to the user of the client device 320 selecting a message thread with the added contact that has been added to the inbox for the user account for the user. The user interface 350 for the message thread may include a contact information display 364. The contact information display 364 may include a name and avatar for the contact with which the message thread is associated. The avatar for a messaging bot may be a photo or other image visually representing the contact. The contact information display 364 may include one or more connections between the user of the client device 320 and the contact, for example a shared school or a number of mutual friends. In some embodiments, the contact information display 364 may eventually be removed from the initial display of a message thread when activated once sufficient messages are received as to occupy its screen space.

The user interface 350 for a message thread may include composition controls 369 that are persistently visible during the display of a message thread. Many, most, or nearly all of the composition controls 369 may empower access to further user interface controls for the performance of various tasks, such as text entry, media selection, emoji selection, camera use, a social approval icon, etc.

The user interface 350 for the message thread may comprise a message interaction display 363. The message interaction display 363 may comprise the messages exchanged within the message thread. The message interaction display 363 may be initially empty due to no messages having been exchanged at the time of the creation of the message thread.

However, in some embodiments, administrative text 365 may be automatically displayed in a first access to a message thread with an added contact for the user that added the contact. The administrative text 365 may comprise a context for the message thread, communicating that the user of the client device 320 added the added contact that the message thread is with as a contact with the messaging system.

Figure 3D:
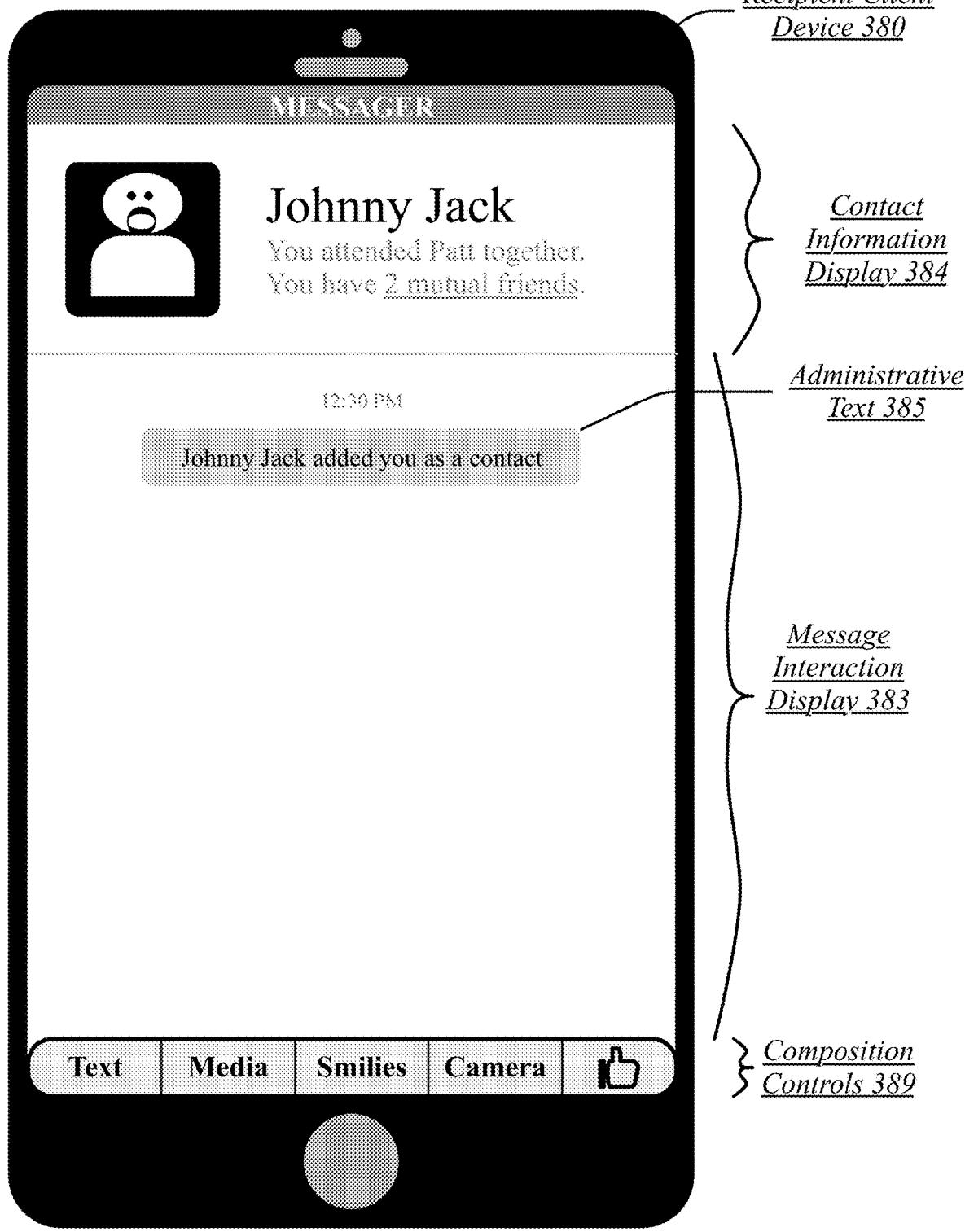
FIG. 3D illustrates an embodiment of a user interface for a message thread for an added contact on a recipient client device.

FIG. 3D illustrates an embodiment of a user interface 375 for a message thread for an added contact on a recipient client device 380.

The user interface 375 may be displayed in response to the user of the recipient client device 380 selecting a message thread with the user that added them as a contact that has been added to the inbox for the added contact. The user interface 375 may include a contact information display 384 substantially similar to the contact information display 364 described with reference to FIG. 3C. The contact information display 384 for the added contact, on their own client device, may display information relating to the user that added them as a contact.

The user interface 375 may include composition controls 389 the same or substantially similar to the composition controls 369 described with reference to FIG. 3C. The user interface 375 may include a message interaction display 383 substantially similar to the message interaction display 363 describes with reference to FIG. 3C. The message interaction display 383 may include administrative text 385 that communicates a context for the message thread, specifically that another user, with which the messages thread is associated, added the user of the recipient client device 380 as a contact with the messaging system.

Figure 4:
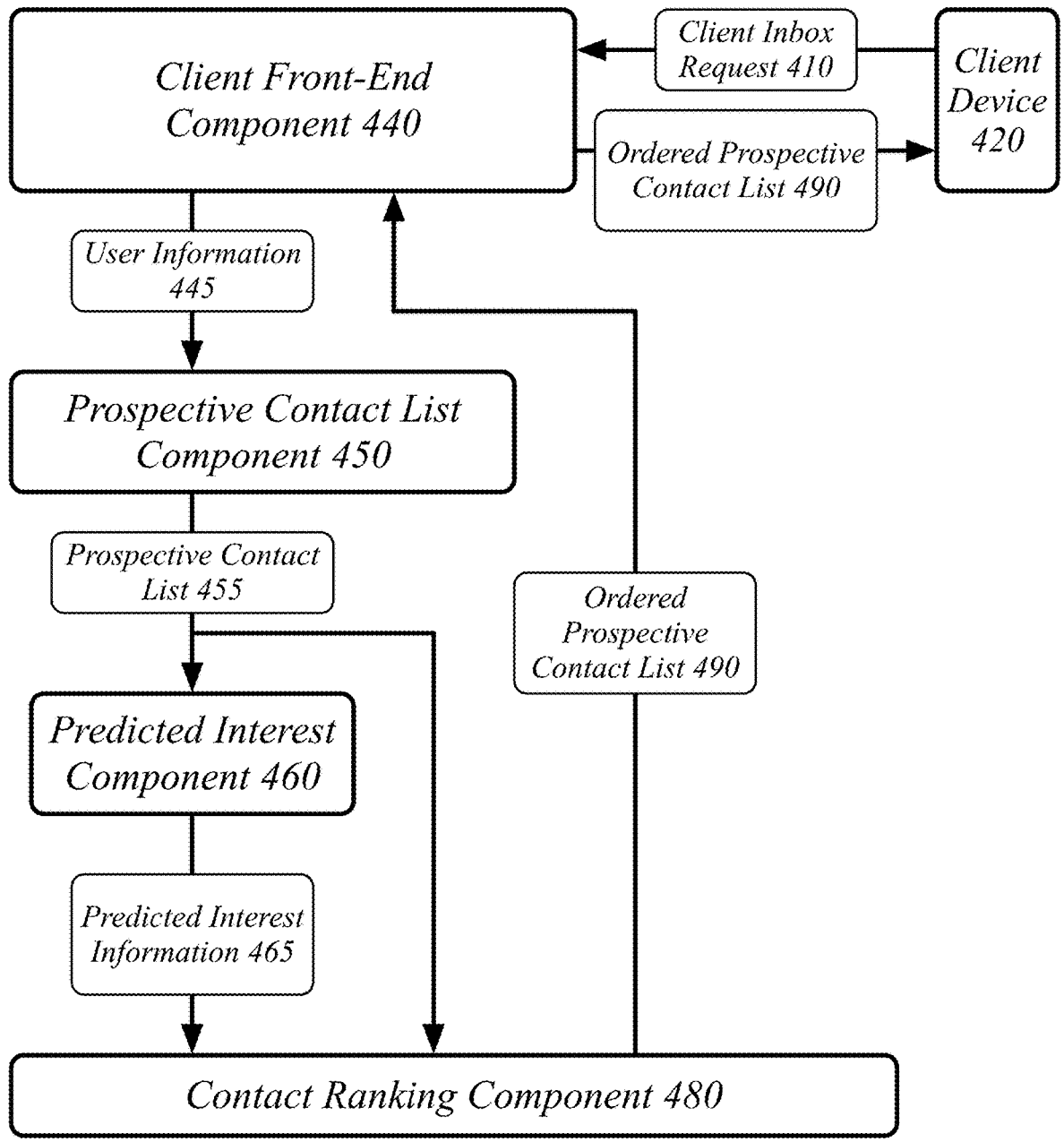
FIG. 4 illustrates an embodiment of a provisional contact promotion system processing a client inbox request.

FIG. 4 illustrates an embodiment of a provisional contact promotion system 100 processing a client inbox request.

The provisional contact promotion system 100 may comprise a plurality of components. The provisional contact promotion system 100 may be operative to provide an ordered prospective contact list 490 to a client device 420. The ordered prospective contact list 490 may configure the client device 420 for display of the prospective contacts according to ranking weights, the ranking weights determined according to a function including a predicted communication interest representing a prediction of a user's interest in messaging with the suggested prospective contacts.

The provisional contact promotion system 100 may comprise a client front-end component 440. The client front-end component 440 may be generally arranged to exchange information with client devices to empower the client devices to engage in messaging activity using a messaging system. The client front-end component 440 may provide access to various messaging services and/or social-networking services. The client front-end component 440 may provide access to the retrieval of a messaging inbox. The client front-end component 440 may provide an ordered prospective contact list 490 to a client device 420. The retrieval of a messaging inbox may include the retrieval of the ordered prospective contact list 490 automatically or the ordered prospective contact list 490 may be performed via a distinct client inbox request 410.

The client front-end component 440 may receive a client inbox request 410 for a user account from a client device 420, the user account for a communication system. The communication system may comprise a messaging system. A client inbox request 410 may be a request for updates to an inbox. Alternatively, a client inbox request 410 may be distinct from a request for updates to an inbox. In some embodiments, a request for an ordered prospective contact list 490 may be sent in coordination with a request for updates to an inbox so as to empower the display of the ordered prospective contact list 490 in association with an inbox.

The client front-end component 440 may transmit an ordered prospective contact list 490 to the client device 420 in response to the client inbox request 410. The ordered prospective contact list 490 may be ordered for display for the user account based on a determined ranking weight for each contact on the ordered prospective contact list 490. The ordered prospective contact list 490 may be ordered for display to the user account in association with a messaging interface for the communication system.

In some cases, a client device 420 may engage in a user search. The client front-end component 440 may interact with the client device 420 to support the user search. The client front-end component 440 may suggest responses to the user search. The client front-end component 440 may interact with the client device 420 to order a type-ahead for a search entry form for the communication system based on the ranking weight.

The provisional contact promotion system 100 may comprise a prospective contact list component 450. The prospective contact list component 450 may be generally arranged to retrieve and manage user information for a user account, such as may include contact information. The prospective contact list component 450 may be operative to determine a prospective contact list 455 for the user account, the prospective contact list comprising a plurality of prospective contacts. The prospective contact list component 450 may receive user information 445 from the client front-end component 440 identifying the user account for a client device 420. For instance, the user information 445 may comprise a user identifier uniquely identifying the user account.

The prospective contact list component 450 generates a prospective contact list 455 for the user account based on the user information 445. The prospective contact list component 450 uses one or more sources of users to generate a pool of users of potential interest to the user of the client device 420. The prospective contact list may be based on a user repository for the communication system. The prospective contact list component 450 performs searches for specific relationships using the user repository, combines the results of the searches, and uses these combined results as an initial list. Generating the prospective contact list 455 for the user account excludes any existing contacts from an existing contact list for the user account. Any existing contacts for the user account are removed from the initial list to generate the prospective contact list 455 used for ranking. The prospective contact list may be generated based on a union of two or more of a contact-of-contact list for the user account, a soft-match list for the user account, a reverse-contact list for the user account, and a short-message-service-match list for the user account.

The provisional contact promotion system 100 may comprise a predicted interest component 460. The predicted interest component 460 may be generally arranged to determine predicted communication interest information based on user information for users of the provisional contact promotion system 100. The user information may comprise social-networking information for a social-networking system, such as may derived from a social graph 200. The predicted interest component 460 determines a predicted communication interest for each prospective contact on the prospective contact list for the user account. The predicted interest component 460 may generate predicted interest information 465 for the user and the prospective contacts of the prospective contact list 455 and provide the predicted interest information 465 to the contact ranking component 480. The predicted interest information 465 may be generated according to known techniques for generating predicted interest.

The predicted communication interest is generated based on a combination of a variety of factors. These factors may represent various possible relationships between the user/user account and the prospective contact. The predicted communication interest may be based on two or more of: a contact-of-contact relationship for each prospective contact of the prospective contact list 455, a soft-match relationship for each prospective contact of the prospective contact list 455, a reverse-contact-list relationship for each prospective contact of the prospective contact list 455, and a short-message-service-match relationship for each prospective contact of the prospective contact list 45.

The prospective contacts may be divided into broad divisions based on the number of the above relationships that exist between the user account for the user of the client device 420 and each of the prospective contacts. Prospective contacts with only one of the listed relationships are ranked below any of the prospective contacts with only two of the listed relationships, which are ranked below any of the prospective contacts with only three of the listed relationships, which are ranked below any of the prospective contacts all four of the listed relationships. It will be appreciated that this technique may be used for any number of relationships. Where these same relationships are used to generate the pool of prospective contacts, no prospective contacts will have zero of the relationships in common with the user account for the user. However, whether additional prospective contacts are included in the pool, some may fail to match any of the listed relationships.

As such, the predicted interest component 460 generates a relationship count for each prospective contact of the prospective contact list 455. The relationship count for each prospective contact measures whether each prospective contact possesses each of a contact-of-contact relationship, a soft-match relationship, a reverse-contact-list relationship, and a short-message-service-match relationship. The predicted interest component 460 determines the ranking weight based on the relationship count, at least in part. The prospective contact list 455 may then be sub-ranked within each of the broader rankings defined by the listed relationships. The prospective contacts with equal relationship count are ranked relative to a contact coefficient. This contact coefficient is generated based on social-networking information from a social-networking system, the contact coefficient measuring a predicted interest in a messaging relationship between the user account and each of the prospective contacts.

A prospective contact has the contact-of-contact relationship with the user account where the user account and the perspective contact have a mutual contact in common. A messaging system may maintain a list of each of the contacts for each user and may compare the list of contacts for each user to determine common contacts between the lists. These prospective contacts with common contacts may be accordingly included in the prospective contact list 455 and receive an additional relationship count when evaluating the prospective contact list 455.

A prospective contact has the soft-match relationship with the user account where an unverified predicted phone number for the user account matches a phone number address book for the prospective contact. A user with a verified phone number—a phone number that the messaging system has verified as belonging to the user, such as through a request-and-response phone number verification—may produce a hard match when the user's phone number is in another user's phone address book. However, where the phone number hasn't been verified, a soft-match may be made based on detected associations between the user and the phone number. For example, if a user's name, or a name detected to be significantly similar to the user's name, appears in an address book in association with the phone number. This soft-match relationship may be assigned a strength or weight based on a confidence in the match. This strength may be higher where a name more precisely matches, more uniquely matches, or is matched based on more user accounts for the messaging system. These prospective contacts with a soft-match relationship may be accordingly included in the prospective contact list 455 and receive an additional relationship count when evaluating the prospective contact list 455.

A prospective contact has the reverse-contact-list relationship with the user account where the user account appears on a contact list for the prospective contact. The prospective contacts with a reverse-contact-list relationship may be accordingly included in the prospective contact list 455 and receive an additional relationship count when evaluating the prospective contact list 455.

A prospective contact has the short-message-service-match relationship with the user account where a short-message-service log for at least one of the user account and the prospective contact indicates an exchange of short-message-service messages between a first client device associated with the user account and a second client device associated with the prospective contact. These prospective contacts with a short-message-service-match relationship may be accordingly included in the prospective contact list 455 and receive an additional relationship count when evaluating the prospective contact list 455.

Machine learning may be used to determine a user's predicted communication interest for each prospective contact. A messaging history for a messaging system may be used to match profile features for users to features for other users to predict a user's interest in communication with a user. A predicted interest component 460 may receive one or more features for each prospective contact on the prospective contact list 455 and receive one or more profile features for one or more users of the messaging system. The predicted interest component 460 may receive a messaging history for the messaging system, with the messaging history comprising historical information about various users engagement with other users via the messaging system. The predicted interest component 460 may generate a predicted communication interest model for the messaging system based on a machine learning analysis of the messaging history, with the predicted communication interest model based on the one or more profile features and the one or more user features. The predicted interest component 460 may thereafter determine the predicted communication interest for each prospective contact on the prospective contact list 455 based on the predicted communication interest model.

The predicted communication interest model may comprise a linear function combining various measures corresponding to various relationships that may be shared between two users as well as additional information relating to the two users. For instance, the predicted communication interest may be based on a linear function of two or more of a contact-of-contact relationship, a soft-match relationship, a reverse-contact-list relationship, a short-message-service-match relationship, and a contact coefficient, wherein the contact coefficient is generated based on social-networking information from a social-networking system.

The contact-of-contact relationship may correspond to a contact-of-contact count. The contact-of-contact count is equal to a count of mutual contacts. The predicted communication interest increases linearly with the contact-of-contact count.

The soft-match relationship may increase relative to a recency with which an unverified predicted phone number for the user account was added to a phone number address book for a prospective contact. Additionally or alternatively, the soft-match relationship increases relative to a soft-match confidence.

The short-message-service-match relationship for a prospective contact may increase relative to a number of short-message-service messages associated with both the user account and the prospective contact.

The linear function may be determined based on a linear regression of a historical data set for the communication system. This linear regression is based on the predicted communication interest model. This predicted communication interest model may predict one or more of an existence of communication interaction between the user account and a prospective contact, a duration of communication interaction between the user account and the prospective contact, a user contact future communication activity measure, and a user contact future engagement measure, without limitation. The prediction of a measure corresponds to probabilities generated based on the historical analysis of previous user behavior with the communication system. A linear regression optimizes for a particular measure, such as the measures listed herein. The linear regression may optimize for a combination of measures, such as a linear function of two or more of the measures listed herein.

A contact ranking component 480 may determine a ranking weight for each prospective contact on the prospective contact list 455 based on predicted communication interest for each prospective contact. In some cases, the predicted communication interests may each comprise a numerical score, this numerical score used as the ranking weight. The contact ranking component 480 may order the prospective contact list 455 for display for the user account based on the determined ranking weight for each prospective contact on the prospective contact list 455 to generate the ordered prospective contact list 490.

In some cases, the ranking weight may be reduced for one or more previously-viewed prospective contacts of the prospective contact list 455. The ranking weight may be reduced for the one or more previously-viewed prospective contacts by a linear multiplier based on a number of viewings. The contact ranking component 480 may track the number of times a contact is included in a prospective contact list 455 and use this number as the number of viewings. Alternatively, the client device 420 may track the number of times a prospective contact is actually displayed to the user and provide it to the provisional contact promotion system 100 for use as the number of viewings.

In another alternative, previously-viewed prospective contacts may be excluded, possibly temporarily, from the displayed provisional contact list rather than down-ranked. The prospective contact list component 450 may exclude one or more previously-viewed prospective contacts from the prospective contact list when generating the prospective contact list. The one or more previously-viewed prospective contacts may be excluded from the prospective contact list based on a recentness with which the one or more previously-viewed prospective contacts had been viewed. Alternatively or additionally, one or more previously-viewed prospective contacts may be excluded from the prospective contact list based on a count of the number of times with which the one or more previously-viewed prospective contacts had been viewed, such that a prospective contact has a set number of times it may be viewed before being excluded. Exclusions may be temporary and expire, after which, for instance, a viewed-count may be reset.

In some embodiments, the prospective contact list 455 may only be displayed where sufficient interest is predicted for the prospective contacts on the prospective contact list 455. An aggregate, cumulative, average, maximum, or other collective measure of the prospective contact list 455 may be generated. In these embodiments, the prospective contact list 455 is only sent to the client device 420 and/or is sent to the client device 420 but only displayed on the client device 420 where the collective measure exceeds a defined threshold. In general, the provisional contact promotion system 100 may determine whether to display the prospective contact list 455 based on a predicted contact list utility, where the predicted contact list utility predicts an expected utility to the user in being shown the prospective contact list 455. The expected utility may vary based on the number of contacts for a user, such by reducing the expected utility where a user already has a large, such as predefined, number of contacts already. The expected utility may vary based on the number of active contacts for a user, such by reducing the expected utility where a user already has a large, such as predefined, number of active contacts.

The prospective contact list 455 may be periodically re-generated and/or re-ranked. In some embodiments, the provisional contact promotion system 100 may re-rank the prospective contact list based on a periodic schedule. In some embodiments, the provisional contact promotion system 100 may re-rank the prospective contact list 455 in response to a membership change for the prospective contact list 455, such as where the pool of users from which the prospective contacts are drawn gains an additional member.

Each prospective contact on the prospective contact list is operative to empower a user to add the contact, perhaps after one or more additional interactions. In some embodiments, selecting a prospective contact in a messaging client may open a contact add dialog for the prospective contact when selected. The provisional contact promotion system 100 may receive a contact request confirmation based on the contact add dialog and send a contact addition notification to a prospective contact associated with the contact add dialog.

The provisional contact promotion system 100 may receive a contact request confirmation based on a contact add dialog and generate a message thread between the user account and a prospective contact based on the contact request confirmation for the contact add dialog for the prospective contact. The provisional contact promotion system 100 may set notification text, such as administrative text, for the message thread between the user account and the prospective contact, the notification text indicating a contact request from the user account to the prospective contact. This message thread may be generated on a client device for one or more of the user account and the prospective contact.

The suggestion of a prospective contact may result in the initiation of communication between the user and the prospective contact. The client front-end component 440 may receive a communication initiation from the user account. This communication initiation is addressed to a particular address. Because the prospective contact was selected for the user, the user's initiation of communication is highly unlikely to be spam, unwanted commercial communication. As such, where the communication initiation is addressed to selected prospective contact from the prospective contact list, the client front-end component 440 may bypass a spam detection system for the communication system in relay of the communication initiation in response to the communication initiation being addressed to the selected prospective contact from the prospective contact list 455.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may determine a prospective contact list for a user account for a communication system, the prospective contact list comprising a plurality of prospective contacts at block 502.

The logic flow 500 may determine a predicted communication interest for each prospective contact on the prospective contact list for the user account at block 504.

The logic flow 500 may determine a ranking weight for each prospective contact on the prospective contact list based on the predicted communication interest for each prospective contact at block 506.

The logic flow 500 may order the prospective contact list for display for the user account based on the determined ranking weight for each prospective contact on the prospective contact list at block 508.

The embodiments are not limited to this example.

Figure 6:
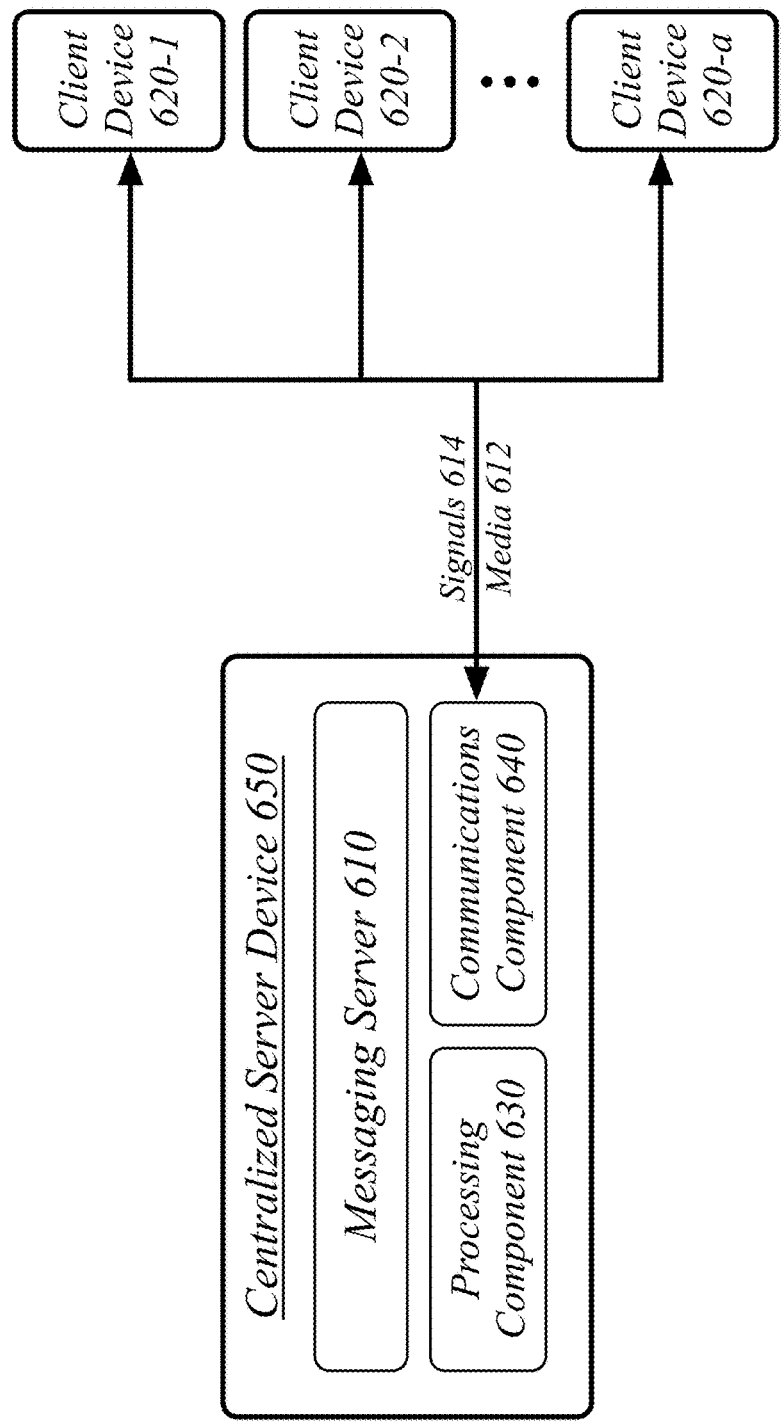
FIG. 6 illustrates an embodiment of a centralized system for the system of FIG. 1.

FIG. 6 illustrates a block diagram of a centralized system 600. The centralized system 600 may implement some or all of the structure and/or operations for the provisional contact promotion system 100 in a single computing entity, such as entirely within a single centralized server device 650.

The centralized server device 650 may comprise any electronic device capable of receiving, processing, and sending information for the provisional contact promotion system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 650 may execute processing operations or logic for the provisional contact promotion system 100 using a processing component 630. The processing component 630 may comprise various hardware elements, software elements, or a combination of both.

Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 650 may execute communications operations or logic for the provisional contact promotion system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 650 may communicate with other devices over a communications media 612 using communications signals 614 via the communications component 640. The devices may be internal or external to the centralized server device 650 as desired for a given implementation.

The centralized server device 650 may execute a messaging server 610. The messaging server 610 may comprise a messaging server for a messaging system, such as a messaging server performing messaging server functions as described for the messaging servers 110 in reference to FIG. 1. The messaging server 610 may provide messaging operations for a plurality of client devices 620, receiving and sending messages between the client devices 620. The client devices 620 may correspond to one or more of a smartphone device 150, tablet device 160, personal computer device 180, and/or any of the client device 320, recipient client device 380, client device 420, or any other client device.

Figure 7:
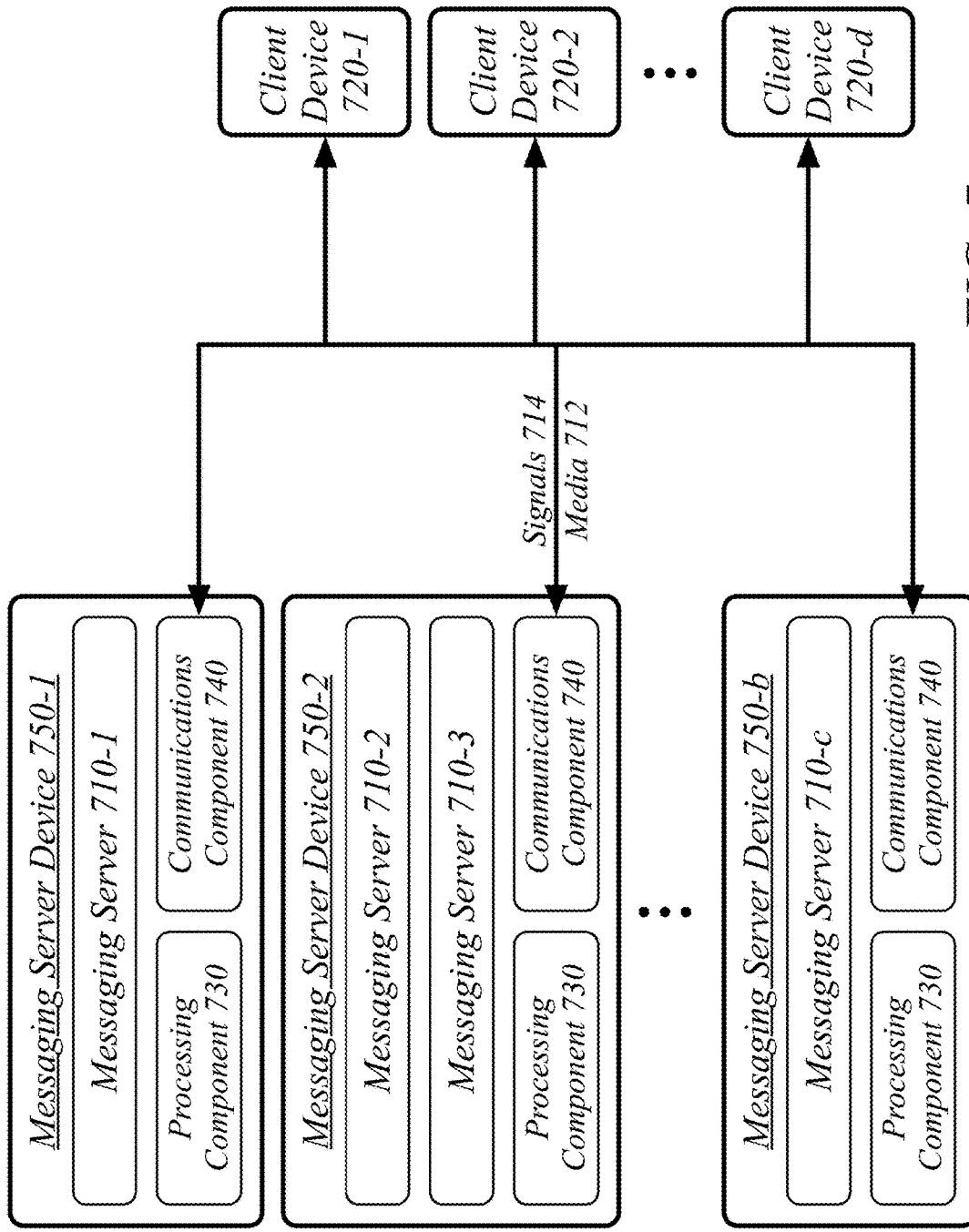
FIG. 7 illustrates an embodiment of a distributed system for the system of FIG. 1.

FIG. 7 illustrates a block diagram of a distributed system 700. The distributed system 700 may distribute portions of the structure and/or operations for the provisional contact promotion system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a plurality of messaging server devices 750. In general, the server devices 750 may be the same or similar to the centralized server device 650 as described with reference to FIG. 6. For instance, the server devices 750 may each comprise a processing component 730 and a communications component 740 which are the same or similar to the processing component 630 and the communications component 640, respectively, as described with reference to FIG. 6. In another example, the server devices 750 may communicate over a communications media 712 using communications signals 714 via the communications components 740.

The messaging server devices 750 may comprise or employ one or more server programs that operate to perform various methodologies in accordance with the described embodiments. In one embodiment, for example, the messaging server devices 750 may each execute one of a plurality of messaging servers 710. The messaging servers 710 may comprise messaging servers for a messaging system, such as a messaging servers performing messaging server functions as described for the messaging servers 110 in reference to FIG. 1. The messaging servers 710 may provide messaging operations for a plurality of client devices 720, receiving and sending messages between the client devices 720. The client devices 720 may correspond to one or more of a smartphone device 150, tablet device 160, personal computer device 180, and/or any of the client device 320, recipient client device 380, client device 420, client devices 620, or any other client device.

Figure 8:
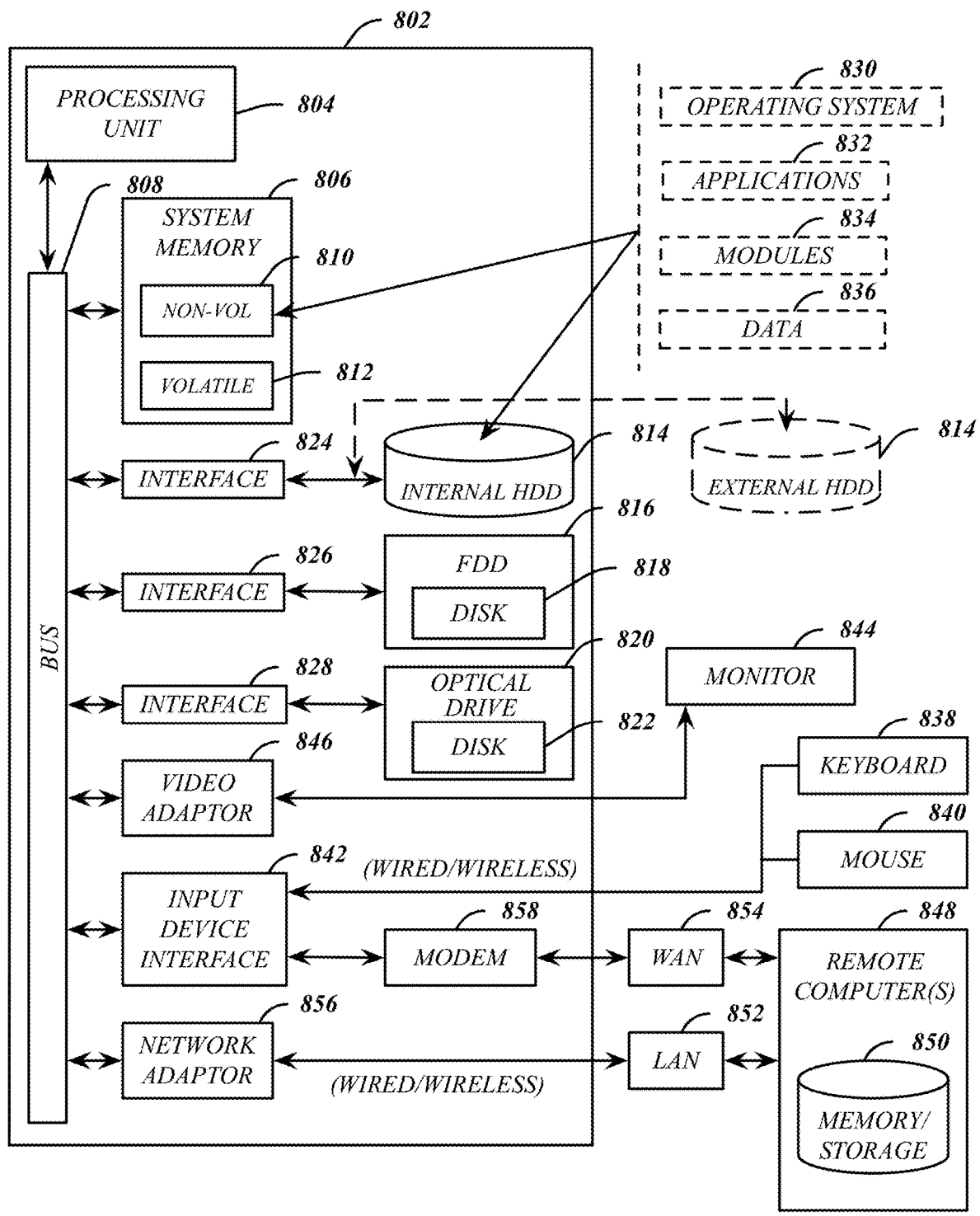
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the provisional contact promotion system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
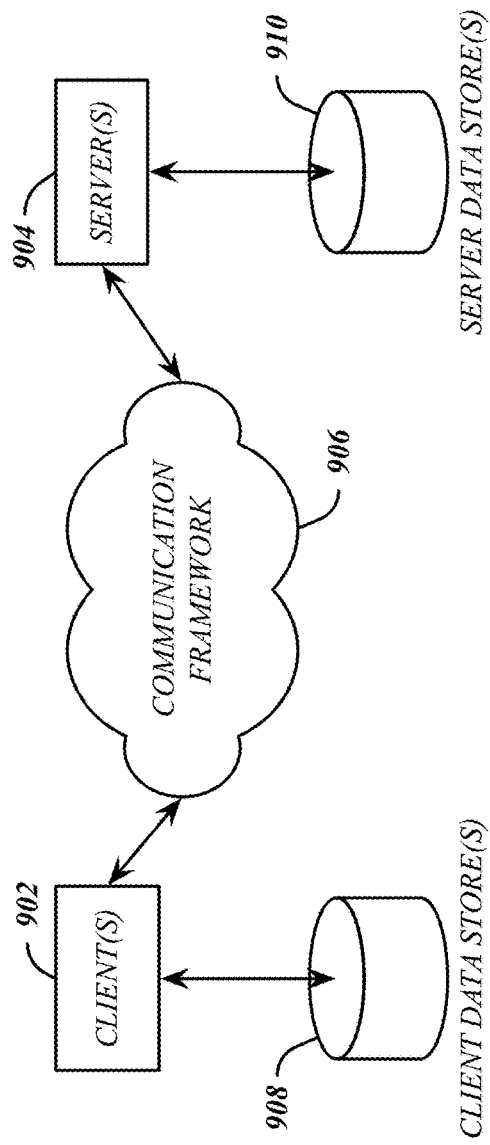
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may correspond to messaging clients executed by one or more client devices, such as one or more of a smartphone device 150, tablet device 160, personal computer device 180, and/or any of the client device 320, recipient client device 380, client device 420, client devices 620, client devices 720, or any other client device. The servers 904 may implement messaging servers, such as messaging server 610, messaging servers 110, or messaging servers 710. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
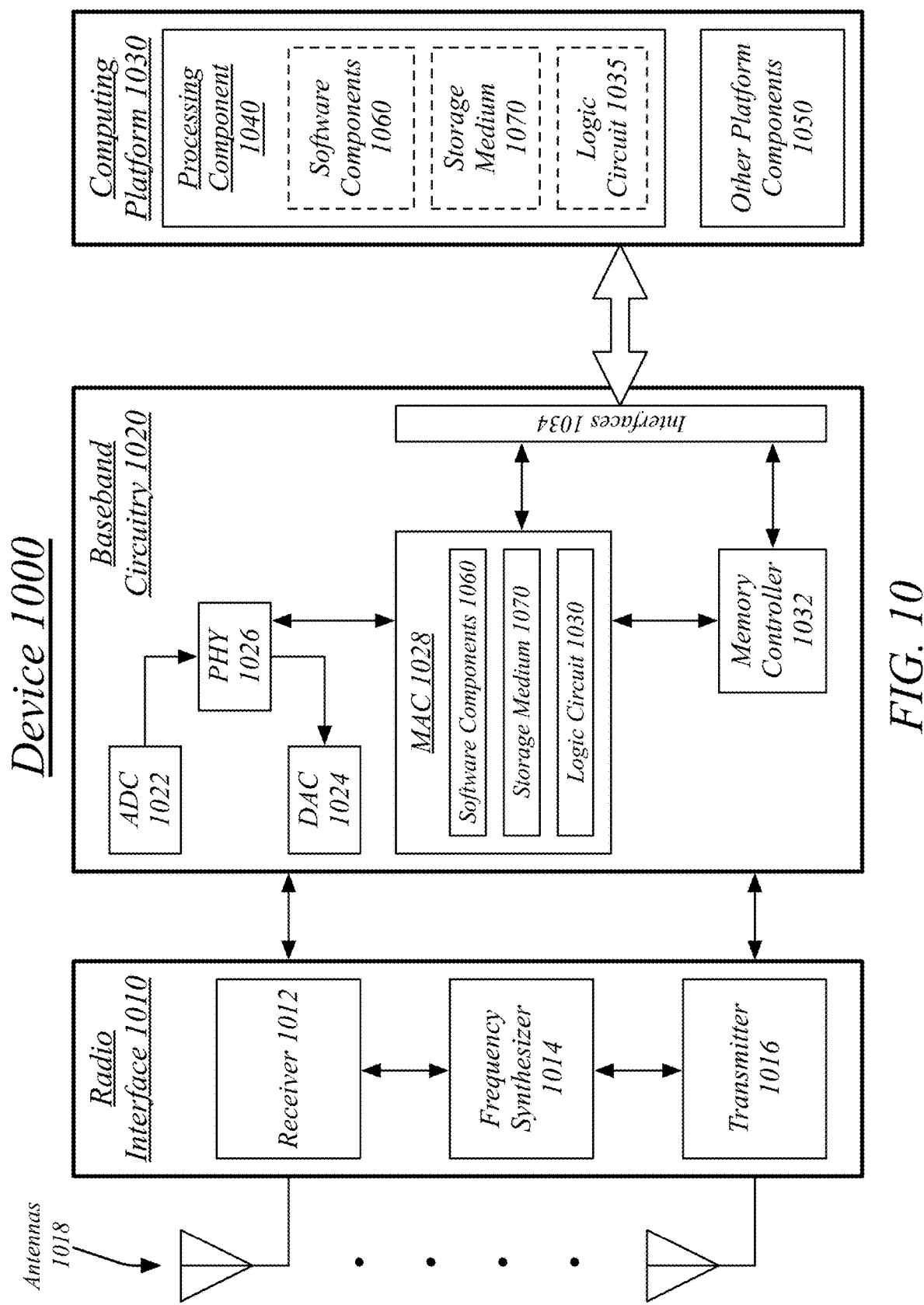
FIG. 10 illustrates an embodiment of a radio device architecture.

FIG. 10 illustrates an embodiment of a device 1000 for use in a multicarrier OFDM system, such as the provisional contact promotion system 100. Device 1000 may implement, for example, software components 1060 as described with reference to provisional contact promotion system 100 and/or a logic circuit 1035. The logic circuit 1035 may include physical circuits to perform operations described for the provisional contact promotion system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the provisional contact promotion system 100 and/or logic circuit 1035 in a single computing entity, such as entirely within a single device. Alternatively, the device 1000 may distribute portions of the structure and/or operations for the provisional contact promotion system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the provisional contact promotion system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise determining a prospective contact list for a user account for a communication system, the prospective contact list comprising a plurality of prospective contacts; determining a predicted communication interest for each prospective contact on the prospective contact list for the user account; determining a ranking weight for each prospective contact on the prospective contact list based on the predicted communication interest for each prospective contact; and ordering the prospective contact list for display for the user account based on the determined ranking weight for each prospective contact on the prospective contact list.

A computer-implemented method may further comprise determining whether to display the prospective contact list based on a predicted contact list utility.

A computer-implemented method may further comprise re-ranking the prospective contact list based on a periodic schedule.

A computer-implemented method may further comprise re-ranking the prospective contact list in response to a membership change for the prospective contact list.

A computer-implemented method may further comprise generating the prospective contact list based on a user repository for the communication system, wherein generating the prospective contact list for the user account excludes any existing contacts from an existing contact list for the user account.

A computer-implemented method may further comprise ordering the promotion contact list for display to the user account in association with a messaging interface for the communication system.

A computer-implemented method may further comprise wherein the predicted communication interest is based on two or more of a contact-of-contact relationship for each prospective contact of the prospective contact list, a soft-match relationship for each prospective contact of the prospective contact list, a reverse-contact-list relationship for each prospective contact of the prospective contact list, and a short-message-service-match relationship for each prospective contact of the prospective contact list.

A computer-implemented method may further comprise generating a relationship count for each prospective contact of the prospective contact list, wherein the relationship count for each prospective contact measures whether each prospective contact possesses each of a contact-of-contact relationship, a soft-match relationship, a reverse-contact-list relationship, and a short-message-service-match relationship; and determining the ranking weight based on the relationship count.

A computer-implemented method may further comprise wherein a prospective contact has the contact-of-contact relationship with the user account where the user account and the perspective contact have a mutual contact in common.

A computer-implemented method may further comprise wherein a prospective contact has the soft-match relationship with the user account where an unverified predicted phone number for the user account matches a phone number address book for the prospective contact.

A computer-implemented method may further comprise wherein a prospective contact has the reverse-contact-list relationship with the user account where the user account appears on a contact list for the prospective contact.

A computer-implemented method may further comprise wherein a prospective contact has the short-message-service-match relationship with the user account where a short-message-service log for at least one of the user account and the prospective contact indicates an exchange of short-message-service messages between a first client device associated with the user account and a second client device associated with the prospective contact.

A computer-implemented method may further comprise wherein prospective contacts with equal relationship count are ranked relative to a contact coefficient, wherein the contact coefficient is generated based on social-networking information from a social-networking system.

A computer-implemented method may further comprise wherein the prospective contact list is generated based on a union of two or more of a contact-of-contact list for the user account, a soft-match list for the user account, a reverse-contact list for the user account, and a short-message-service-match list for the user account.

A computer-implemented method may further comprise wherein the predicted communication interest is based on a linear function of two or more of a contact-of-contact relationship, a soft-match relationship, a reverse-contact-list relationship, a short-message-service-match relationship, and a contact coefficient, wherein the contact coefficient is generated based on social-networking information from a social-networking system.

A computer-implemented method may further comprise wherein the contact-of-contact relationship corresponds to a contact-of-contact count, the contact-of-contact count equal to a count of mutual contacts, wherein the predicted communication interest increases linearly with the contact-of-contact count.

A computer-implemented method may further comprise wherein the soft-match relationship increases relative to a recency with which an unverified predicted phone number for the user account was added to a phone number address book for a prospective contact.

A computer-implemented method may further comprise wherein the soft-match relationship increases relative to a soft-match confidence.

A computer-implemented method may further comprise wherein the short-message-service-match relationship for a prospective contact increases relative to a number of shortmessage-service messages associated with both the user account and the prospective contact.

A computer-implemented method may further comprise the linear function determined based on a linear regression of a historical data set for the communication system.

A computer-implemented method may further comprise the linear regression based on a predicted communication interest model, the predicted communication interest model predicting one or more of an existence of communication interaction between the user account and a prospective contact, a duration of communication interaction between the user account and the prospective contact, a user contact future communication activity measure, and a user contact future engagement measure.

A computer-implemented method may further comprise the ranking weight reduced for one or more previously-viewed prospective contacts of the prospective contact list.

A computer-implemented method may further comprise the ranking weight reduced for the one or more previously-viewed contacts by a linear multiplier based on a number of viewings.

A computer-implemented method may further comprise excluding one or more previously-viewed prospective contacts from the prospective contact list when generating the prospective contact list.

A computer-implemented method may further comprise wherein the one or more previously-viewed prospective contacts are excluded from the prospective contact list based on a recentness with which the one or more previously-viewed prospective contacts had been viewed.

A computer-implemented method may further comprise wherein each prospective contact on the prospective contact list is operative to open a contact add dialog for the prospective contact when selected.

A computer-implemented method may further comprise receiving a contact request confirmation based on the contact add dialog; and sending a contact addition notification to a prospective contact associated with the contact add dialog.

A computer-implemented method may further comprise receiving a contact request confirmation based on the contact add dialog; generating a message thread between the user account and a prospective contact based on the contact request confirmation for the contact add dialog for the prospective contact; and setting notification text for the message thread between the user account and the prospective contact, the notification text indicating a contact request from the user account to the prospective contact.

A computer-implemented method may further comprise the message thread generated on a client device for one or more of the user account and the prospective contact.

A computer-implemented method may further comprise receiving a communication initiation from the user account, the communication initiation addressed to a selected prospective contact from the prospective contact list; and bypassing a spam detection system for the communication system in relay of the communication initiation in response to the communication initiation being addressed to the selected prospective contact from the prospective contact list.

An apparatus may comprise a processor circuit on a device; a client front-end component operative on the processor circuit to receive a client inbox request for a user account from a client device, the user account for a communication system; and send an ordered prospective contact list to the client device in response to the client inbox request, the ordered prospective contact list ordered for display for the user account based on a determined ranking weight for each prospective contact on the ordered prospective contact list; a prospective contact list component operative to generate a prospective contact list for a user account for a communication system based on a user repository for the communication system, the prospective contact list comprising a plurality of prospective contacts, wherein generating the prospective contact list for the user account excludes any existing contacts from an existing contact list for the user account; a predicted interest component operative to determine a predicted communication interest for each prospective contact on the prospective contact list for the user account; and a contact ranking component operative to determine a ranking weight for each prospective contact on the prospective contact list based on the predicted communication interest for each prospective contact list. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   determining a prospective contact list for a user account for a communication system, the prospective contact list comprising a plurality of prospective contacts wherein the prospective contact list is generated based on a union of two or more of a contact-of-contact list for the user account, a soft-match list for the user account where an unverified predicted phone number for the user account matches a phone number address book for a one of the prospective contacts, a reverse-contact list for the user account, and a short-message-service-match list for the user account;
   determining a predicted communication interest for each prospective contact on the prospective contact list for the user account, wherein, for each prospective contact, the predicted communication interest comprises a prediction of interest in messaging with the prospective contact using the user account;
   determining a ranking weight for each prospective contact on the prospective contact list based on the predicted communication interest for each prospective contact; and
   ordering the prospective contact list for display for the user account based on the determined ranking weight for each prospective contact on the prospective contact list.

2. An apparatus, comprising:
   a processor circuit on a device;
   a client front-end component operative on the processor circuit to receive a client inbox request for a user account from a client device, the user account for a communication system; and send an ordered prospective contact list to the client device in response to the client inbox request, the ordered prospective contact list ordered for display for the user account based on a determined ranking weight for each prospective contact on the ordered prospective contact list;
   a prospective contact list component operative to generate a prospective contact list for a user account for a communication system based on a user repository for the communication system, the prospective contact list comprising a plurality of prospective contacts, wherein generating the prospective contact list for the user account excludes any existing contacts from an existing contact list for the user account and wherein the prospective contact list is generated based on a union of two or more of a contact-of-contact list for the user account, a soft-match list for the user account where an unverified predicted phone number for the user account matches a phone number address book for a one of the prospective contacts, a reverse-contact list for the user account, and a short-message-service-match list for the user account;
   a predicted interest component operative to determine a predicted communication interest for each prospective contact on the prospective contact list for the user account, wherein, for each prospective contact, the predicted communication interest comprises a prediction of interest in messaging with the prospective contact using the user account; and
   a contact ranking component operative to determine a ranking weight for each prospective contact on the prospective contact list based on the predicted communication interest for each prospective contact list.

3. At least one computer-readable storage medium comprising instructions that, when executed, cause a system to:
   generate a prospective contact list for a user account for a communication system based on a user repository for the communication system, the prospective contact list comprising a plurality of prospective contacts, wherein generating the prospective contact list for the user account excludes any existing contacts from an existing contact list for the user account and wherein the prospective contact list is generated based on a union of two or more of a contact-of-contact list for the user account, a soft-match list for the user account where an unverified predicted phone number for the user account matches a phone number address book for a one of the prospective contacts, a reverse-contact list for the user account, and a short-message-service-match list for the user account;
   determine a predicted communication interest for each prospective contact on the prospective contact list for the user account, wherein, for each prospective contact, the predicted communication interest comprises a prediction of interest in messaging with the prospective contact using the user account;
determine a ranking weight for each prospective contact on the prospective contact list based on the predicted communication interest for each prospective contact; and
order the prospective contact list for display for the user account based on the determined ranking weight for each prospective contact on the prospective contact list.

4. The method of claim 1, further comprising:
generating the prospective contact list based on a user repository for the communication system, wherein generating the prospective contact list for the user account excludes any existing contacts from an existing contact list for the user account.

5. The method of claim 1, further comprising:
ordering the prospective contact list for display to the user account in association with a messaging interface for the communication system.

6. The method of claim 1, further comprising:
generating a relationship count for each prospective contact of the prospective contact list, wherein the relationship count for each prospective contact measures whether each prospective contact possesses each of a contact-of-contact relationship, a soft-match relationship, a reverse-contact-list relationship, and a short-message-service-match relationship; and
determining the ranking weight based on the relationship count.

7. The method of claim 1, wherein the predicted communication interest is based on a linear function of two or more of a contact-of-contact relationship, a soft-match relationship, a reverse-contact-list relationship, a short-message-service-match relationship, and a contact coefficient, wherein the contact coefficient is generated based on social-networking information from a social-networking system.

8. The method of claim 1, wherein a confidence strength score is associated with each contact on the soft-match list.

9. The apparatus of claim 2, further comprising:
the predicted interest component operative to generate a relationship count for each prospective contact of the prospective contact list, wherein the relationship count for each prospective contact measures whether each prospective contact possesses each of a contact-of-contact relationship, a soft-match relationship, a reverse-contact-list relationship, and a short-message-service-match relationship; and
the contact ranking component operative to determine the ranking weight based on the relationship count, wherein prospective contacts with equal relationship count are ranked relative to a contact coefficient, wherein the contact coefficient is generated based on social-networking information from a social-networking system.

10. The apparatus of claim 2, wherein the predicted communication interest is based on a linear function of two or more of a contact-of-contact relationship, a soft-match relationship, a reverse-contact-list relationship, a short-message-service-match relationship, and a contact coefficient, wherein the contact coefficient is generated based on social-networking information from a social-networking system, the linear function determined based on a linear regression of a historical data set for the communication system, the linear regression based on a predicted communication interest model, the predicted communication interest model predicting one or more of an existence of communication interaction between the user account and a prospective contact, a duration of communication interaction between the user account and the prospective contact, a user contact future communication activity measure, and a user contact future engagement measure.

11. The apparatus of claim 2, wherein a confidence strength score is associated with each contact on the soft-match list.

12. The computer-readable storage medium of claim 3, comprising further instructions that, when executed, cause a system to:
generate a relationship count for each prospective contact of the prospective contact list, wherein the relationship count for each prospective contact measures whether each prospective contact possesses each of a contact-of-contact relationship, a soft-match relationship, a reverse-contact-list relationship, and a short-message-service-match relationship; and
determine the ranking weight based on the relationship count, wherein prospective contacts with equal relationship count are ranked relative to a contact coefficient, wherein the contact coefficient is generated based on social-networking information from a social-networking system.

13. The computer-readable storage medium of claim 3, wherein the predicted communication interest is based on a linear function of two or more of a contact-of-contact relationship, a soft-match relationship, a reverse-contact-list relationship, a short-message-service-match relationship, and a contact coefficient, wherein the contact coefficient is generated based on social-networking information from a social-networking system, the linear function determined based on a linear regression of a historical data set for the communication system, the linear regression based on a predicted communication interest model, the predicted communication interest model predicting one or more of an existence of communication interaction between the user account and a prospective contact, a duration of communication interaction between the user account and the prospective contact, a user contact future communication activity measure, and a user contact future engagement measure.

14. The computer-readable storage medium of claim 3, wherein a confidence strength score is associated with each contact on the soft-match list.

15. The method of claim 6, wherein prospective contacts with equal relationship count are ranked relative to a contact coefficient, wherein the contact coefficient is generated based on social-networking information from a social-networking system.

16. The method of claim 7, the linear function determined based on a linear regression of a historical data set for the communication system.

17. The method of claim 16, the linear regression based on a predicted communication interest model, the predicted communication interest model predicting one or more of an existence of communication interaction between the user account and a prospective contact, a duration of communication interaction between the user account and the prospective contact, a user contact future communication activity measure, and a user contact future engagement measure.

* * * * *